(12) United States Patent
Tran (10) Patent No.: US 12,106,114 B2
(45) Date of Patent: *Oct. 1, 2024

(54) MICROPROCESSOR WITH SHARED READ AND WRITE BUSES AND INSTRUCTION ISSUANCE TO MULTIPLE REGISTER SETS IN ACCORDANCE WITH A TIME COUNTER

(71) Applicant: Simplex Micro, Inc., San Jose, CA (US)

(72) Inventor: Thang Minh Tran, Tustin, CA (US)

(73) Assignee: Simplex Micro, Inc., Austin, TX (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/733,728

(22) Filed: Apr. 29, 2022

(65) Prior Publication Data

US 2023/0350680 A1   Nov. 2, 2023

(51) Int. Cl.
*G06F 9/38* (2018.01)
*G06F 9/30* (2018.01)

(52) U.S. Cl.
CPC .......... *G06F 9/3836* (2013.01); *G06F 9/3838* (2013.01); *G06F 9/384* (2013.01); *G06F 9/3885* (2013.01); *G06F 9/3012* (2013.01)

(58) Field of Classification Search
CPC ...... G06F 9/3836; G06F 9/384; G06F 9/3838; G06F 9/3854; G06F 9/3858
See application file for complete search history.

(56) References Cited

U.S. PATENT DOCUMENTS

| | | |
|---|---|---|
| 5,021,985 A | 6/1991 | Hu et al. |
| 5,185,868 A | 2/1993 | Tran |
| 5,251,306 A | 10/1993 | Tran |
| 5,655,096 A | 8/1997 | Branigin |
| 5,699,536 A | 12/1997 | Hopkins et al. |
| 5,799,163 A * | 8/1998 | Park .................... G06F 9/30018 712/E9.019 |
| 5,802,386 A | 9/1998 | Kahle et al. |
| 5,809,268 A | 9/1998 | Chan |
| 5,835,745 A | 11/1998 | Sager et al. |
| 5,860,018 A | 1/1999 | Panwar |
| 5,881,302 A | 3/1999 | Omata |
| 5,958,041 A | 9/1999 | Petolino, Jr. et al. |
| 5,961,630 A | 10/1999 | Zaidi et al. |

(Continued)

FOREIGN PATENT DOCUMENTS

| | | |
|---|---|---|
| EP | 0840213 A2 | 5/1998 |
| EP | 0902360 A2 | 3/1999 |

(Continued)

OTHER PUBLICATIONS

U.S. Appl. No. 17/588,315, Jan. 30, 2022, Thang Minh Tran, Entire Document.

(Continued)

*Primary Examiner* — Courtney P Spann
(74) *Attorney, Agent, or Firm* — Appleton Luff (57) ABSTRACT

A processor includes a time counter and a time-resource matrix and statically dispatches baseline and extended instructions. The processor includes a plurality of register sets of a register file and a plurality of sets of functional units which are coupled by sets of dedicated read and write buses to allow parallel execution of baseline and extended instructions.

23 Claims, 6 Drawing Sheets

(56) References Cited

U.S. PATENT DOCUMENTS

| | | | |
|---|---|---|---|
| 5,964,867 A | 10/1999 | Anderson et al. | |
| 5,996,061 A | 11/1999 | Lopez-Aguado et al. | |
| 5,996,064 A * | 11/1999 | Zaidi | G06F 9/3856 |
| | | | 712/216 |
| 6,016,540 A | 1/2000 | Zaidi et al. | |
| 6,035,393 A | 3/2000 | Glew et al. | |
| 6,065,105 A | 5/2000 | Zaidi et al. | |
| 6,247,113 B1 | 6/2001 | Jaggar | |
| 6,282,634 B1 | 8/2001 | Hinds et al. | |
| 6,304,955 B1 | 10/2001 | Arora | |
| 6,425,090 B1 | 7/2002 | Arimilli et al. | |
| 6,453,424 B1 * | 9/2002 | Janniello | G06F 9/3836 |
| | | | 713/400 |
| 7,069,425 B1 * | 6/2006 | Takahashi | G06F 9/30079 |
| | | | 712/E9.032 |
| 7,434,032 B1 | 10/2008 | Coon et al. | |
| 8,166,281 B2 | 4/2012 | Gschwind et al. | |
| 9,256,428 B2 | 2/2016 | Heil et al. | |
| 11,132,199 B1 | 9/2021 | Tran | |
| 11,144,319 B1 | 10/2021 | Battle et al. | |
| 11,163,582 B1 | 11/2021 | Tran | |
| 11,204,770 B2 | 12/2021 | Tran | |
| 11,263,013 B2 | 3/2022 | Tran | |
| 2001/0004755 A1 * | 6/2001 | Levy | G06F 9/3832 |
| | | | 712/217 |
| 2003/0135712 A1 | 7/2003 | Theis | |
| 2004/0073779 A1 | 4/2004 | Hokenek et al. | |
| 2006/0010305 A1 | 1/2006 | Maeda et al. | |
| 2006/0095732 A1 | 5/2006 | Tran et al. | |
| 2006/0218124 A1 | 9/2006 | Williamson et al. | |
| 2006/0259800 A1 | 11/2006 | Maejima | |
| 2006/0288194 A1 * | 12/2006 | Lewis | G06F 9/3869 |
| | | | 712/220 |
| 2007/0260856 A1 * | 11/2007 | Tran | G06F 9/3885 |
| | | | 712/217 |
| 2011/0099354 A1 | 4/2011 | Takashima et al. | |
| 2011/0320765 A1 | 12/2011 | Karkhanis et al. | |
| 2012/0047352 A1 * | 2/2012 | Yamana | G06F 9/3814 |
| | | | 712/E9.033 |
| 2013/0151816 A1 | 6/2013 | Indukuru et al. | |
| 2013/0297912 A1 * | 11/2013 | Tran | G06F 9/3885 |
| | | | 712/E9.028 |
| 2013/0346985 A1 | 12/2013 | Nightingale | |
| 2014/0082626 A1 | 3/2014 | Busaba et al. | |
| 2015/0227369 A1 | 8/2015 | Gonion | |
| 2016/0092238 A1 | 3/2016 | Codrescu et al. | |
| 2016/0371091 A1 | 12/2016 | Brownscheidle et al. | |
| 2017/0357513 A1 | 12/2017 | Ayub et al. | |
| 2018/0196678 A1 | 7/2018 | Thompto | |
| 2019/0243646 A1 * | 8/2019 | Anderson | G06F 9/3869 |
| 2020/0004543 A1 | 1/2020 | Kumar et al. | |
| 2020/0387382 A1 | 12/2020 | Tseng et al. | |
| 2021/0026639 A1 | 1/2021 | Tekmen et al. | |
| 2021/0311743 A1 | 10/2021 | Tran | |
| 2021/0326141 A1 | 10/2021 | Tran | |
| 2023/0068637 A1 * | 3/2023 | Feiste | G06F 9/384 |
| 2023/0244490 A1 | 8/2023 | Tran | |
| 2023/0244491 A1 | 8/2023 | Tran | |

FOREIGN PATENT DOCUMENTS

| | | |
|---|---|---|
| EP | 0959575 A1 | 11/1999 |
| WO | 0010076 A1 | 2/2000 |
| WO | 0208894 A1 | 1/2002 |
| WO | 0213005 A1 | 2/2002 |

OTHER PUBLICATIONS

U.S. Appl. No. 17/672,622, Feb. 15, 2022, Thang Minh Tran, Entire Document.

U.S. Appl. No. 17/697,870, Mar. 17, 2022, Thang Minh Tran, Entire Document.

U.S. Appl. No. 17/725,476, Apr. 20, 2022, Thang Minh Tran, Entire Document.

Anonymous: "RISC-V—Wikipedia", Apr. 16, 2022 (Apr. 16, 2022), XP093142703, Retrieved from the Internet: URL:https://en.wikipedia.org/w/index.php?title=RISC-V&oldid=1083030760 [retrieved on Mar. 27, 2024].

Choi, W., Park, SJ., Dubois, M. (2009). Accurate Instruction Pre-scheduling in Dynamically Scheduled Processors. In: Stenström, P. (eds) Transactions on High-Performance Embedded Architectures and Compilers I. Lecture Notes in Computer Science, vol. 5470 Springer, Berlin, Heidelberg. pp. 107-127. (Year: 2009).

Diavastos, Andreas & Carlson, Trevor. (2021). Efficient Instruction Scheduling using Real-time Load Delay Tracking. (Year: 2021).

J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).

PCT/US2023/018996, Written Opinion of the International Preliminary Examining Authority, Apr. 8, 2024.

PCT/US23/27497: Written Opinion of the International Searching Authority.

Written Opinion of The International Preliminary Examining Authority, PCTUS2023/018970, Mar. 25, 2024.

Written Opinion of the International Searching Authority, PCT/S2022/052185.

Written Opinion of the International Searching Authority, PCT/US2023/018970.

Written Opinion of the International Searching Authority, PCT/US2023/018996.

PCTUS2023081682, Written Opinion of the International Searching Authority, Mar. 22, 2024.

PCT/US2023/018996, International Preliminary Report on Patentability, Jul. 19, 2024.

PCT/US2023/018970, International Preliminary Report on Patentability, Jul. 18, 2024.

* cited by examiner

| Resource Matrix for Baseline Register Set | | | | | | | | Resource Matrix for Extended Register Set | | | | | | | | Shared Resource | |
|---|---|---|---|---|---|---|---|---|---|---|---|---|---|---|---|---|---|
| Time | Rd buses | Wr buses | ALU | LS | MUL | DIV | BEU | Rd buses | Wr buses | ALU | LS | MUL | DIV | BEU | | Rd buses | Wr buses |
| 127 | | | | | | | | | | | | | | | | | |
| 27 | | | | | | | | | | | | | | | | | |
| 26 | | | | | | | 0 | | | | | | | | | | |
| 25 | | 2 | 1 | 1 | 1 | 0 | 1 | 0 | 1 | 1 | 0 | 1 | 0 | 1 | | 1 | 1 |
| 24 | 1 | | | | | | | | | | | | | | | | |
| 15 | 3 | 2 | 2 | 2 | 1 | 0 | 0 | 3 | 2 | 2 | 2 | 1 | 0 | 0 | | 3 | 2 |
| 14 | 0 | 0 | 0 | 0 | 0 | 0 | 0 | 0 | 0 | 0 | 0 | 0 | 0 | 0 | | 0 | 0 |
| 0 | | | | | | | | | | | | | | | | | |
|   | 51A | 52A | 53A | 56A | 57A | 58A | 59A | 51B | 52B | 53B | 56B | 57B | 58B | 59B | | 51C | 52C | write time, execute time, read time, time count

MICROPROCESSOR WITH SHARED READ AND WRITE BUSES AND INSTRUCTION ISSUANCE TO MULTIPLE REGISTER SETS IN ACCORDANCE WITH A TIME COUNTER

RELATED APPLICATIONS

This application is related to the following U.S. patent applications which are each hereby incorporated by reference in their entirety: U.S. patent application Ser. No. 17/588,315, filed Jan. 30, 2022, and entitled "Microprocessor with Time Counter for Statically Dispatching Instructions;" U.S. patent application Ser. No. 17/697,870, filed Mar. 17, 2022, and entitled "Multi-Threading Microprocessor With A Time Counter For Statically Dispatching Instructions;" and U.S. patent application Ser. No. 17/725,476, filed Apr. 20, 2022, and entitled "Microprocessor With A Time Counter For Statically Dispatching Extended Instructions."

BACKGROUND

Technical Field

The present invention relates to the field of computer processors. More particularly, it relates to issuing and executing instructions based on a time count in a processor where the processor consists of a general-purpose microprocessor, a digital-signal processor, a single instruction multiple data processor, a vector processor, a graphics processor, or other type of microprocessor which executes instructions.

Technical Background

Processors have become increasingly complex chasing small increments in performance at the expense of power consumption and semiconductor chip area. The approach in out-of-order (OOO) superscalar microprocessors has remained basically the same for the last 25-30 years, with much of the power dissipation arising from the dynamic scheduling of instructions for execution from the reservation stations or central windows. Designing an OOO superscalar microprocessor is a huge undertaking. Hundreds of instructions are issued to the execution pipeline where the data dependencies are resolved and arbitrated for execution by a large number of functional units. The result data from the functional units are again arbitrated for the write buses to write back to the register file. If the data cannot be written back to the register file, then the result data are kept in temporary registers and a complicated stalling procedure is performed for the execution pipeline.

Many commercially available processors have extended instruction sets. The instructions are extended to improve performance of various specialized applications. The new instruction set is typically built alongside the default instruction set and enables communication and execution with other processors such as a floating-point unit, a signal processing unit, a specialized graphics processor, etc. The extended instructions may include requirements for new register files and functional units in the execution pipeline Unfortunately, as registers and functional units are added to the execution pipeline, the complexity of this traditional approach increases dramatically. In addition to specialized hardware to support the extended instructions, functional units are often added to improve performance. This demands larger register files and more read and write ports to the register file. The large number of read/write ports improve performance but critically increase the chip area. In some cases, routing of the additional read and write buses through the register file and additional functional units is difficult and increases chip area.

Thus, there is a need for a superscalar microprocessor which can be efficiently configured to extend the instruction set, consumes less power, has a simpler design, has an effective design for the register file, and is scalable with consistently high performance.

SUMMARY

The disclosed embodiments provide a processor with a time counter and a method for statically dispatching standard and extended instructions to an execution pipeline with preset execution times based on a time count from the counter. As referred to herein, the term "extended instruction" refers to an instruction that is specially implemented in a processor in addition to a baseline instruction set of a particular architecture implemented by the processor. For example, a baseline instruction set may not include the capability of executing floating point arithmetic calculations.

Implementation of any extended instruction in a processor is not necessary to the processor being compliant with a particular architecture. However, certain processor implementations implement extended instruction(s) to enhance performance and/or simplify programming. These extended instructions can make use of reserved opcodes employed in some instruction set architectures. For example, the RISC-V instruction set allows addition of extended instructions to perform custom specific applications or certain scientific applications such as integer multiply and divide, floating point arithmetic, or digital signal processing. The extended instructions use reserved opcodes for custom extension instructions or standard extension instructions.

An execution queue receives the time count and receives the baseline and extended instructions, then dispatches the instructions, to an appropriate functional unit when the time count reaches the preset execution time count. The time counter provides a time count representing a specified time of the processor and is incremented periodically. An instruction issue unit is coupled to the time counter and receives all instructions including extended instructions. A disclosed approach to microprocessor design employs static scheduling of instructions. A static scheduling algorithm is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependency, (2) availability of read buses to read data from the register file, (3) availability of a functional unit to execute the instruction, and (4) availability of a write bus to write result data back to the register file.

All the above requirements are associated with time: (1) a time when all data dependencies are resolved, (2) at which time the read buses are available to read source operands from a register file, (3) at which subsequent time the functional unit is available to execute the instruction, and (4) at which further subsequent time the write bus is available to write result data back to the register file. A time-resource matrix in a microprocessor may be logically organized as a number of rows, one row corresponding to a time count of the counter, with each row divided into a number of columns, one for each resource. In such an organization, the values in the columns represent the counts for each resource to indicate how many resources have been used by previous instructions in the execution pipeline.

In one embodiment a time counter increments periodically, for example, every clock cycle, and the resulting count is used to statically schedule instruction execution. Instructions have known throughput and latency times, and thus can be scheduled for execution based on the time count. For example, an add instruction with throughput and latency time of 1 can be scheduled to execute when any data dependency is resolved. If the time count is 5 and the add has no data dependency at time 8, then the available read buses are scheduled to read data from the register file at time 8, the available arithmetic logic unit (ALU) is scheduled to execute the add instruction at time 9, and the available write bus is scheduled to write result data from ALU to the register file at time 9. The read buses, the ALUs, and the write buses are the resources represented in the time-resource matrix. After the add instruction is issued, the number of available read buses at time 8 is reduced by the number of valid source registers of the add instruction, the number of available ALUs at time 9 is reduced by 1, and the number of available write buses at time 9 is reduced by 1 for valid destination register of the add instruction. The add instruction is dispatched to the ALU execution queue with the preset execution times. The aforementioned resource availability adjustment results in subsequent instructions with a read time of 8 seeing fewer read buses, similarly for the ALU and the write buses at time 9. In one embodiment, the count value of a resource is an exact resource number to be used for the issued instruction. For example, if the number of write buses is 5, then the resource count of 0 indicates that the first write bus is used for the issue instruction. The resource count for the write buses is incremented by 1 and the next instruction uses the second write bus.

In high performance microprocessors where multiple instructions or operations are executed per clock cycle, the register file requires a large number of read and write ports. As the instructions are decoded, the destination registers are renamed to allow out-of-order execution. A physical register file consists of the architectural registers as defined by the instruction set architecture and the temporary registers for renaming. For example, the physical register file has 128 entries which consists of 32 architectural registers for the baseline instructions, 32 architectural registers for extended instructions and 64 temporary registers. In some high performance processors, the physical register file may have 8 read ports and 6 write ports, which are very expensive in area. Furthermore, the increased number of functional units makes routing of the read and write buses inefficient.

In one embodiment of the processor described here, the physical register file is structured as 2 sets of registers with each set of registers having 4 read ports and 3 write ports. In some cases, the splitting the register file into 2 register sets with half the number of read and write ports can reduce the total area required for the registers by about 50%. Thus, the processor chip area is greatly reduced while retaining improved performance. The functional units are designated as baseline and extended functional units and are coupled to the baseline and extended register set.

The resources in the time-resource matrix are structured accordingly for the baseline and extended registers. For example, 3 read buses and 2 write buses are dedicated to instructions with baseline register references and baseline functional units, 3 read buses and 2 write buses are dedicated to instructions with extended register references and extended functional units, and 2 read buses and 2 write buses are shared by the register sets and both baseline and extended functional units. The split up of the resources of the same type (read buses, write buses) permits better scalability of a multi-issue processor to issue multiple instructions in a single cycle.

BRIEF DESCRIPTION OF THE DRAWINGS

Aspects of the present invention are best understood from the following description when read with the accompanying figures.

DETAILED DESCRIPTION

The following description provides different embodiments for implementing aspects of the present invention. Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment a processor is provided, typically implemented as a microprocessor, that schedules instructions to be executed at a preset time based on a time count from a time counter. In such a microprocessor the instructions are scheduled to be executed using the known throughput and latency of each instruction to be executed. For example, in one embodiment, the ALU instructions have throughput and latency times of 1, the multiply instructions have throughput time of 1 and a latency time of 2, the load instructions have the throughput time of 1 and a latency time of 3 (based on a data cache hit), and the divide instruction have throughput and latency times of 32.

Figure 1:
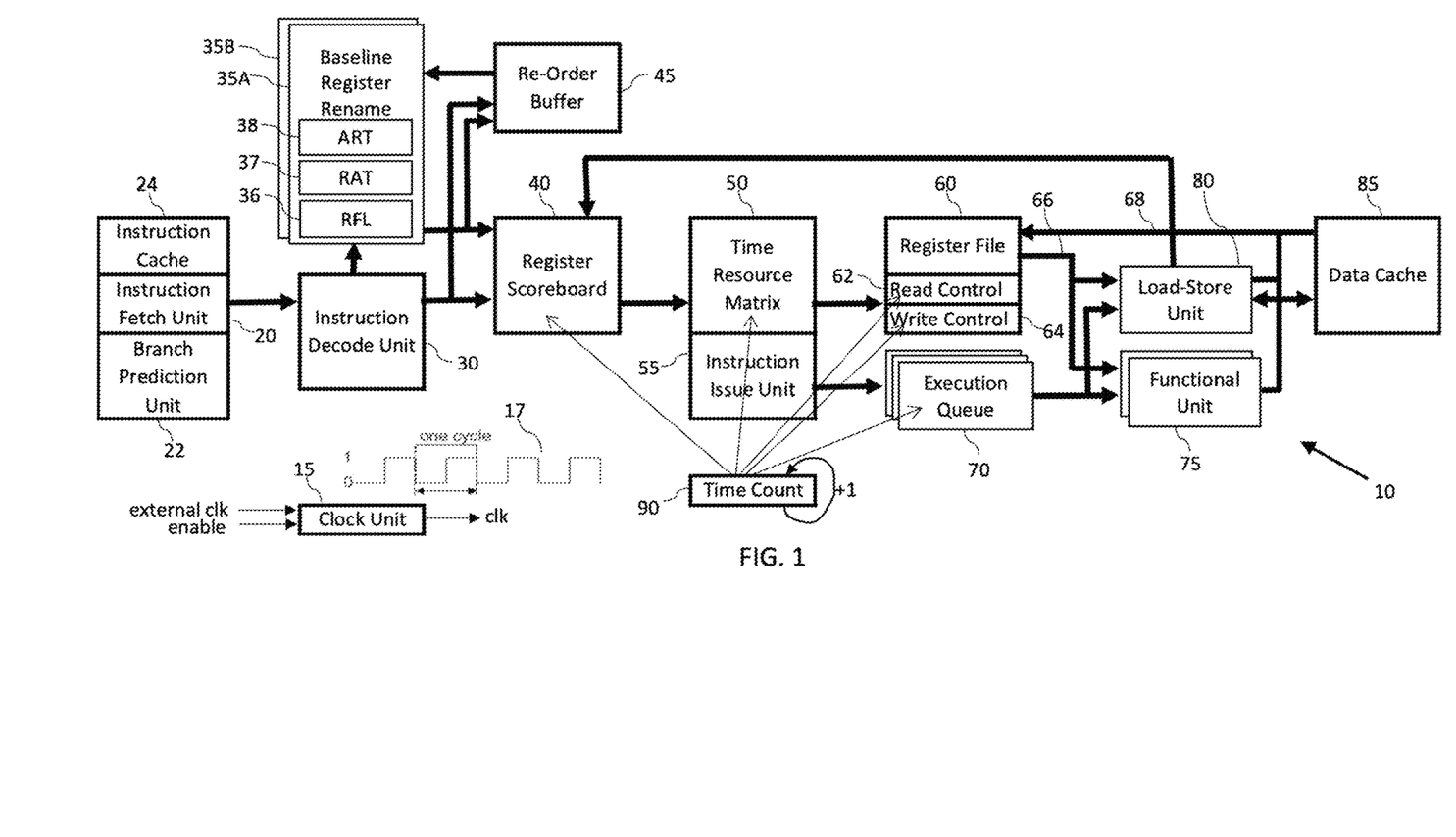
FIG. 1 is a block diagram illustrating a processor based data processing system in accordance with present invention.

FIG. 1 is a block diagram of a microprocessor based data processing system. The exemplary system includes a microprocessor 10 having an instruction fetch unit 20, an instruction cache 24, a branch prediction unit 22, an instruction decode unit 30, a register renaming unit 35, a register scoreboard 40, a re-order buffer 45, a time-resource matrix 50, an instruction issue unit 55, a register file 60, a read control unit 62, a write control unit 64, a plurality of execution queues 70, a plurality of functional units 75, a load-store unit 80, a data cache 85, and a co-processor 100. The microprocessor 10 includes a plurality of read buses 66 coupling the register files to the functional units 75 and load-store unit 80. The system also includes a plurality of write buses 68 to write result data from the functional unit 75, the load-store unit 80, and the data cache 85 to the register file 60. The microprocessor 10 is a synchronous microprocessor where the clock unit 15 generates a clock signal ("clk") which couples to all the units in the microprocessor 10. The clock unit 15 provides a continuously toggling logic signal 17 which toggles between 0 and 1 repeatedly at a clock frequency. Clock output signal ("clk") of clock unit 15 enables synchronizing many different units and states in the microprocessor 10. The clock signal is used to sequence data and instructions through the units that perform the various computations in the microprocessor 10. The clock unit 15 may include an external clock as an input to synchronize the microprocessor 10 with external units (not shown). The clock unit 15 may further receive an enable signal to disable the clock unit when the microprocessor is in an idle stage or otherwise not used for instruction execution.

According to an embodiment the microprocessor 10 also includes a time counter unit 90 which stores a time count incremented, in one embodiment, every clock cycle. The time counter unit 90 is coupled to the clock unit 15 and uses "clk" signal to increment the time count. In one embodiment the time count represents the time in clock cycles when an instruction in the instruction issue unit 55 is scheduled for execution. For example, if the current time count is 5 and an instruction is scheduled to be executed in 22 cycles, then the instruction is sent to the execution queue 70 with the execution time count of 27. When the time count increments to 26, the execution queue 70 issues the instruction to the functional unit 75 for execution in next cycle (time count 27). The time counter unit 90 is coupled to the register scoreboard 40, the time-resource matrix 50, the read control 62, the write control 64, and the plurality of execution queues 70.

The scoreboard 40 resolves data dependencies in the instructions. The time-resource matrix 50 checks availability of the various resources which in one embodiment include the read buses 66, the functional units 75, the load-store unit 80, and the write buses 68. The read control unit 62, the write control unit 64, and the execution queues 70 receive the corresponding scheduled times from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time discussed below. The execution queue 70 is set to dispatch an instruction to a functional unit 75 or the load-store unit 80 at a preset time. In each case, the preset time is the time setup by the instruction decode unit 30. The preset time is a future time based on the time count, so when the time count counts up to the future preset time, then the specified action will happen, where the specified action is reading data from the register file 60, writing data to the register file 60, or issuing an instruction to a functional unit 75 for execution. The instruction decode unit 30 determines that the instruction is free of any data dependency. The resource is available to set the "preset time" for the instruction to be executed in the execution pipeline.

In the microprocessor system 10, the instruction fetch unit 20 fetches the next instruction(s) from the instruction cache 24 to send to the instruction decode unit 30. One or more instructions can be fetched per clock cycle from the instruction fetch unit depending on the configuration of microprocessor 10. For higher performance, an embodiment of microprocessor 10 fetches more instructions per clock cycle for the instruction decode unit 30. For low-power and embedded applications, an embodiment of microprocessor 10 might fetch only a single instruction per clock cycle for the instruction decode unit 30. If the instructions are not in the instruction cache 24 (commonly referred to as an instruction cache miss), then the instruction fetch unit 20 sends a request to external memory (not shown) to fetch the required instructions. The external memory may consist of hierarchical memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit is also coupled with the branch prediction unit 22 for prediction of the next instruction address when the branch is detected and predicted by the branch prediction unit 22. The instruction fetch unit 20, the instruction cache 24, and the branch prediction unit 22 are described here for completeness of a microprocessor 10. In other embodiments, other instruction fetch and branch prediction methods can be used to supply instructions to the instruction decode unit 30 for microprocessor 10.

The instruction decode unit 30 is coupled to the instruction fetch unit 20 to receive new instructions and also coupled to the register renaming unit 35 and the register scoreboard 40. The instruction decode unit 30 decodes the instructions for instruction type, instruction throughput, latency times, and register operands. The register operands, for example, may consist of 2 source operands and 1 destination operand. The operands are referenced to registers in the register file 60. The source and destination registers are used here to represent the source and destination operands of the instruction. The source registers support solving read-after-write (RAW) data dependencies. If a later instruction has the same source register as the destination register of an earlier instruction, then the later instruction has RAW data dependency. The later instruction must wait for completion of the earlier instruction before it can start execution.

Other data dependencies for the instructions include the write-after-write (WAW) and write-after-read (WAR). The WAW data dependency occurs when 2 instructions write back to the same destination register. The WAW dependency restricts the later instruction from writing back to the same destination register before the earlier instruction is written to it. To address the WAW dependency, every destination register is renamed by the register renaming unit 35 where the later instruction is written to a different register from the earlier register, thus eliminating the WAW data dependency. For example, if three instructions have the same destination register R5, and which are renamed to R37, R68, R74 then the three instructions can write to the destination register at any time. Without renaming, all three instructions will try to write to the same register R5 which is a WAW dependency in that the third instruction cannot write to R5 before the second instruction, which cannot write to R5 before the first instruction.

The register renaming unit 35 also eliminates the WAR data dependency where the later instruction cannot write to a register until the earlier instruction reads the same register. Since the destination register of the later instruction is renamed, the earlier instruction can read the register at any time. In such an embodiment, as the destination registers are renamed, the instructions are executed out-of-order and written back to the renamed destination register out-of-order. The register scoreboard 40 is used to keep track of the completion time of all destination registers. In a preferred embodiment the completion time is maintained in reference to the time count 90.

In one embodiment, two register renaming units 35A and 35B are implemented for the baseline instructions and extended instructions. The baseline instructions correspond to the base architecture instruction set necessary for microprocessor 10 to implement to be compatible with the base architecture. The extended instructions can correspond to a set of second baseline instructions for a multithreading microprocessor, or from the reserved extended opcodes of an instruction set architecture such as RISC-V, or from standard extension instructions for an architecture such as floating-point or digital signal processing. Each register renaming unit consists of a register free list (RFL) 36, a register alias table (RAT) 37, and an architectural register table (ART) 38. In the below description the reference numbers for the register renaming units 35A and 35B are referred to using only reference numeral 35 to simplify the explanation. In one embodiment, an instruction set architecture with 32-entry baseline architectural registers and 32-entry extended architecture registers has 64 temporary registers for renaming, for a total of 128 physical registers, referred to as the register file 60. The temporary registers need not be evenly divided between the baseline and extended registers. The temporary registers can be divided in any proportion between the baseline and extended registers. The temporary registers are allocated to the RFL 36 of the register renaming units 35A and 35B. The architectural registers from the instructions are mapped into the physical register file 60 which the issue and execute pipelines of the microprocessor 10 use to execute instructions based on the registers in register file 60. In the above-described embodiment, register scoreboard 40 keeps the write back time for the 128 physical registers. The register scoreboard 40 is associated with the physical register file 60. The RFL 36 of each register renaming unit 35 keeps track of temporary registers which have not been used. As the destination register of an instruction is renamed, a free-list register is used for renaming. The register alias table 37 stores the latest renamed registers of the architectural registers. For example, if register R5 is renamed to be temporary register R52, then the register alias table 37 stores the renaming of R5 to R52. Thus, any source operand which references to R5 will see R52 instead of R5. As the architectural register R5 is renamed to R52, eventually when register R52 is retired, the architectural register R5 becomes R52 as stored in the architectural register table 38, and register R5 is released to the RFL 36. The register scoreboard 40 indicates the earliest time for availability of a source register of the register file 60.

As stated above, in one embodiment, the destination registers of baseline instructions are renamed from the register free list 36 of the register rename unit 35A. The destination registers of the extended instructions can be baseline registers or extended registers which are renamed by the register free list 36 of the register rename unit 35A or 35B, respectively. In another embodiment, the extended instructions correspond to second baseline instructions as in the case of multithreading where the second (or higher order) thread instructions reference only the extended registers.

In one embodiment, if instructions are executed out-of-order, then the re-order buffer 45 is used to ensure correct program execution. The register renaming unit 35 and the instruction decode unit 30 are coupled to the re-order buffer 45 to provide the order of issued instructions and the latest renaming of all architectural registers. The re-order buffer 45 is needed to retire the instructions in order regardless of when the instructions are executed and written back to the register file 60. In one embodiment, re-order buffer 45 takes the form of a first in first out (FIFO) buffer. Inputs are instructions from the decode unit 30 and instructions are retired in order after completion by the functional unit 75 or the load store unit 80. In particular, the re-order buffer 45 flushes all instructions after a branch misprediction or instruction exception. The ART 38 is updated only with the instructions before a branch misprediction or instruction exception. Another function of the re-order buffer 45 is writing data to memory only in accordance with the order of the load and store execution. The data memory (including data cache 85 and external memory) are written in order by retiring of the store instructions from the re-order buffer 45. Retiring of store instructions is performed in order from the store buffer (not shown) in the load store unit 80.

Each of the units shown in the block diagram of FIG. 1 can be implemented in integrated circuit form by one of ordinary skill in the art in view of the present disclosure. With regard to one embodiment of this invention, time counter 99 is a basic N-bit wrap-around counter incrementing by 1 every clock cycle. The time-resource matrix 50 is preferably implemented as registers with entries read and written as with a conventional register structure.

The integrated circuitry employed to implement the units shown in the block diagram of FIG. 1 may be expressed in various forms including as a netlist which takes the form of a listing of the electronic components in a circuit and the list of nodes that each component is connected to. Such a netlist may be provided via an article of manufacture as described below.

In other embodiments, the units shown in the block diagram of FIG. can be implemented as software representations, for example in a hardware description language (such as for example Verilog) that describes the functions performed by the units of FIG. 1 at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

Figure 2:
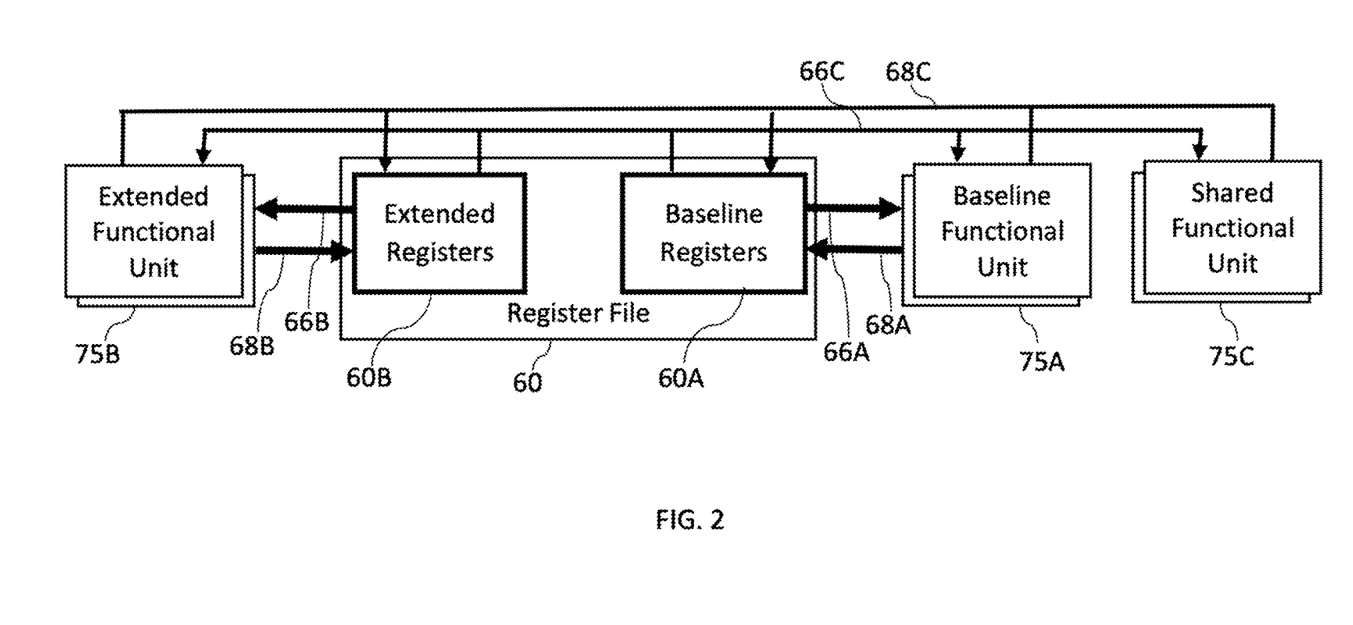
FIG. 2 is a block diagram illustrating a register file with baseline and extended register sets and multiple baseline and extended functional units.

The aforementioned implementations of software executed on a general-purpose, or special purpose, computing system may take the form of a computer-implemented method for implementing a microprocessor, and also as a computer program product for implementing a microprocessor, where the computer program product is stored on a non-transitory computer readable storage medium and include instructions for causing the computer system to execute a method. The aforementioned program modules and/or code segments may be executed on suitable computing system to perform the functions disclosed herein. Such a computing system will typically include one or more processing units, memory and non-transitory storage to execute computer-executable instructions, FIG. 2 illustrates the register file 60 with a baseline register set 60A and an extended register set 60B, multiple baseline functional units 75A, multiple extended functional units 75B, and multiple shared functional units 75C. The preset time in reference throughout the description is based on the future time with respect to the time count 90 where the instruction is free of data dependency and has available resources. The preset time could be the read time for source operands of the instruction from the register file 60, or the execution time of the instruction, or the write time to write result data back to the register file 60. The read control unit 62 is set to read the source operands from the baseline register set 60A on specific read buses 66A at a preset time to the baseline functional units 75A. The read control unit 62 is set to read the source operands from the extended register set 60B on specific read buses 66B at a preset time to the extended functional units 75B. In one embodiment, the read control unit 62 is also set to read the source operands from either the baseline register set 60A or the extended register set 60B on specific shared read buses 66C at a preset time to either the baseline functional units 75A, or the extended functional units 75B, or the shared functional units 75C. The write control unit 64 writes the result data from a baseline functional unit 75A to the baseline register set 60A on a specific write bus 68A at a preset time. The write control unit 64 writes the result data from an extended functional unit 75B to a register of the extended register set 60B on a specific write bus 68B at a preset time. In one embodiment, the write control unit 64 also writes the result data from either a baseline functional unit 75A, or an extended functional unit 75B, or a shared functional unit 75C to a register of the baseline register set 60A or a register of the extended register set 60B on a specific shared write bus 68C at a preset time. The reference numbers for the register set 60A and 60B, the functional units 75A, 75B, and 75C, the read buses 66A, 66B and 66C, and the write buses 68A, 68B and 68C are simplified to 60, 75, 66, and 68 as shown in FIG. 1 in the description for brevity. In one embodiment, the microprocessor 10 has at least 2 functional units for each type of instruction including 2 load-store ports for the load-store unit 80 and data cache 85. In one embodiment, the baseline, extended, and shared buses are coupled to the register file 60 and the 2 baseline/extended load-store ports of the load-store unit 80 in the same manner as the functional units 75.

As an example, the buses consist of 3 read buses 66A and 2 write buses 68A for the baseline register set 60A and baseline functional units 75A, 3 read buses 66B and 2 write buses 68B for the baseline register set 60B and baseline functional units 75B, and the 2 shared buses 66C and 1 write bus 48C for register file 60 and all functional units 75. The baseline and extended functional units include the baseline and extended load-store port of the load-store unit 80, respectively.

FIG. 2 also illustrates an organization for the baseline and floating-point register sets and floating-point functional units where the integer registers are renamed to baseline registers and the floating-point registers are renamed to floating-point registers. The baseline register set 60A is coupled to the integer functional units 75A while the extended register set 60B is coupled to the floating-point functional units 75B. In one embodiment, the microprocessor 10 is a multithreaded microprocessor where the threads of execution run fully parallel and share the resources of a single core in which the second thread registers are renamed to the extended register set 60B. The registers of the first thread are renamed to baseline registers by the RFL 36 of the register rename unit 35A and the registers of the second thread are renamed to the extended registers by the RFL 36 of the register rename unit 35B with 2 sets of first and second thread functional units for independent execution of the thread instructions. If one register free list 36 is empty, then the decode unit 30 will stop accepting instructions from the thread. The division of the register file 60 into a plurality of the register sets allows each register set to have its own functional unit(s), and permits limiting the number of instructions from a thread when its register free list is empty. In some cases, the data widths of the register sets can be different sizes enabling a mixture of extended instructions and functional units. For example, the register set with different data width can be from a set of extended instructions included in the microprocessor 10.

Figure 3:
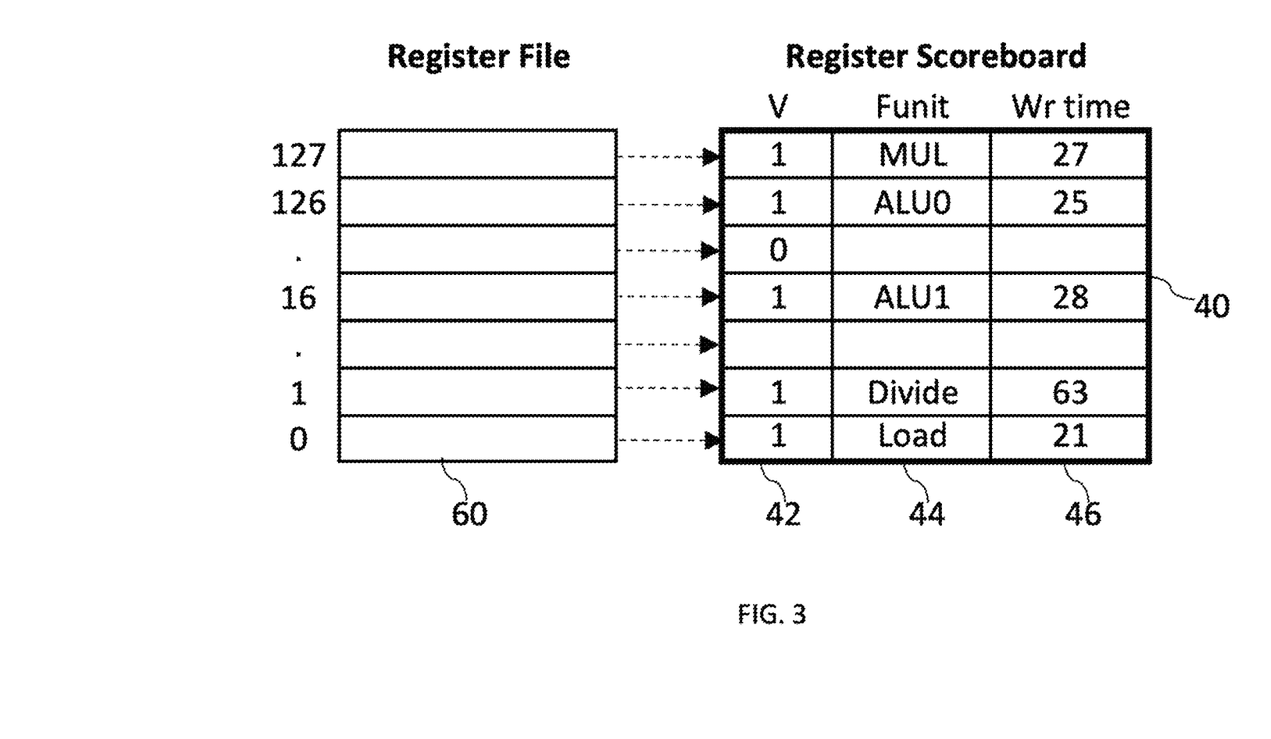
FIG. 3 is a block diagram illustrating a register file and a register scoreboard.

FIG. 3 illustrates the register file 60 and the register scoreboard 40. In one embodiment, the register file 60 has 128 registers, numbered as registers 0 to 127 as illustrated. Each register in the register file 60 has a corresponding entry in the register scoreboard 40. The register scoreboard 40 stores the pending write status for the registers 60. A valid bit field 42 indicates a valid write back to the register file 60 at a future time in reference to the time count 90, as specified by the write time field 46 from a specific functional unit in the "Funit" field 44. As examples illustrated in FIG. 3, register 0 is written back at time count 21 from the load-store unit 80. Register 1 is written back at time count 63 from the divide unit (one of the functional units 75). Register 16 is written back at time count 28 from the ALU1, (another of the functional units 75), etc as illustrated in FIG. 3. The write time 46 is the time in reference to the time count 90. The result data is written to a register of the register file 60. The data is not available from the register file 60 until next clock cycle, but the result data can be forwarded from the functional unit 44 in the register scoreboard 40. For example, if the value of the time count 90 is 19, then the load-store unit 80 produces the result data in 2 clock cycles for writing back to the register file 60 at time count 21. In another embodiment, the register scoreboards 40 can be implemented as 2 sets of register scoreboards one each for the baseline and extended register sets. This is particularly effective for multithreading when the instructions of the 2 threads are isolated and are not crossed references from one thread to another thread.

The write time of a destination register is the read time for the subsequent instruction with RAW data dependency on the same destination register. Referring back to FIG. 1, the source registers of an instruction in the instruction decode unit 30 access the register scoreboard 40 for the read times. If the valid bit 42 of a source register is not set in the register scoreboard 40, then the data in the register file 60 can be accessed at any time provided availability of the read buses 66, otherwise the write time 46 is the earliest time to issue the instruction.

An instruction reads source operand data at read time, executes the instruction with a functional unit 75 at execute time, and writes the result data back to the register file 60 at write time. The write time is recorded in the write time field 46 of the register scoreboard 40. With 2 source registers, the instruction selects the later write time from the register scoreboard 40 as the read time for the instruction. The execute time is the read time plus 1 time count where the functional unit 75 or the load-store unit 80 starts executing the instruction. The write time of the instruction is the read time plus the instruction latency time. If the instruction latency time is 1 (e.g., an ALU instruction), then the write time and execution time of the instruction are the same.

Each instruction has an execution latency time. For example, the add instruction has a latency time of 1, the multiply instruction has a latency time of 2, and the load instruction has a latency time of 3 assuming a data cache hit. In another example, if the current time count is 5 and the source registers of an add instruction receive write time counts of 22 and 24 from the register scoreboard 40, then the read time count is set at 24. In this case, the execution and the write time counts are both 25 for the add instruction. As shown in FIG. 1, the register scoreboard 40 is coupled to the time-resource matrix 50 where the read, execute, and write phases of an instruction access the time-resource matrix 50 for availabilities of the resources.

Figure 4:
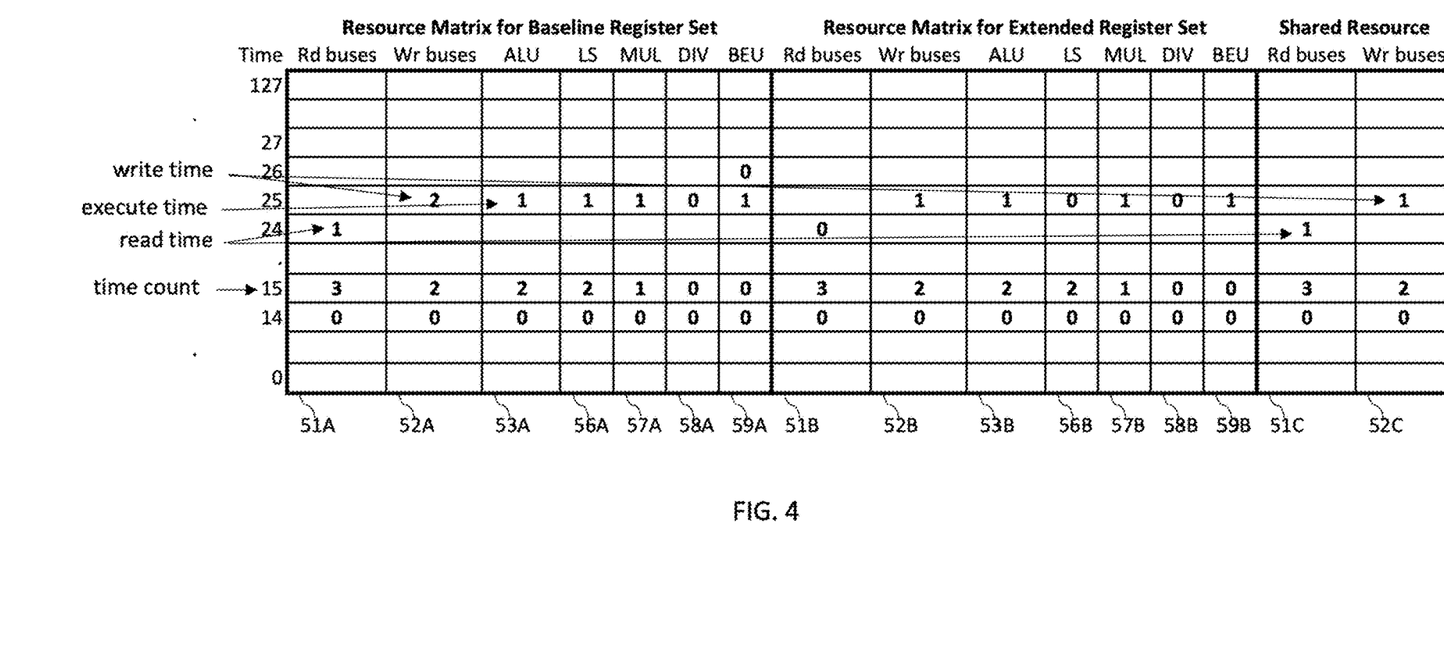
FIG. 4 is a block diagram illustrating a time-resource matrix.

FIG. 4 illustrates the time-resource matrix 50. The time-resource matrix 50 preferably includes the same number of time entries as the time counter 90. For example, if the time counter 90 returns to zero after 128 cycles, then the time-resource matrix 50 preferably has 128 entries. The time counter is incremented every clock cycle and rotates back from the 127th entry to the 0th entry. The columns in the time-resource matrix 50 represent the availability of specific resources. In the embodiment shown in FIG. 4, the time-resource matrix 50 is arranged to identify the availability of resources by identifying the resources that are busy, and specifically the read buses 51A, 51B, and 51C, the write buses 52A, 52B, and 52C, the ALUs 53A and 53B, the load-store ports 56A and 56B, the multiply units 57A and 57B, the divide units 58A and 58B, and the branch execution units (BEU) 59A and 59B. These resources are an example and if other functional units are provided by microprocessor 10 those are also included in the resource matrix 50. The baseline resources designated with the "A" are used by instructions with the baseline register set 60A and the baseline functional units 75A. The extended resources designated with the "B" are used by instructions with the extended register set 60B and the extended functional units 75B. The shared resources designated with the "C" can be used by the entire register file 60 and all functional units 75. In some cases, the reference numbers for the resources with "A", "B", and "C" are used without the letter references for brevity.

The read buses column 51 corresponds to the plurality of read buses 66 in FIG. 1. The write buses column 52 corresponds to the plurality of write buses 68 in FIG. 1. The ALUs column 53, the multiply column 57, the divide column 58, and the branch execution unit column 59 correspond to the plurality of functional units 75 of FIG. 1. The load-port ports column 56 corresponds to the load-store unit 80 of FIG. 1. The load instructions are issued from the instruction issue unit 55 with the expectation of data being in the data cache 85 (data cache hit). In one embodiment, when the data is not present in the data cache 85, then the load instruction changes the write time in the register scoreboard 40 for latency time of a level-2 cache. The instructions that are dependent on the destination register of the replay load instruction are also replayed. The same procedure is used for replaying instructions, the new replay read time, replay execute time, and replay write time must check the time-resource matrix 50 for availability of resources. The replay instructions are statically scheduled for execution with the same procedure as issued instructions.

In one embodiment, an instruction is referred to as an extended instruction if the destination registers are in the extended register set 60B and the instruction is to be executed by the extended functional units 75B. The Instruction Issue Unit 55 for the extended instruction checks the extended resources for availability at the specific read, execute, and write times to dispatch the instruction to the execution queue 70. If the extended instruction references to a register in the baseline register set 60A, then the shared resources 51C and 52C are checked for availability to dispatch the instruction to the execution queue 70. In one embodiment, the shared resource can be used by the extended instruction for a register in the extended register set 60B where the shared resources provide some flexibility for not stalling the instruction in the issue unit 55.

FIG. 4 also shows an example of the information in the time-resource matrix 50. Shown is data with a read time count of 24, an execution time count of 25, and a write time count of 25. When a baseline instruction accesses the time-resource matrix 50 for availability of resources, the matrix 50 shows that at read time 24, 1 baseline read bus and 1 shared read bus are busy, at execution time 25, 1 baseline ALUs, 1 baseline load-store port, 1 baseline multiply unit, and 1 baseline BEU are taken for execution of previous instructions, and at write time 25, 2 baseline write buses and 1 shared write bus are busy. In an example, the numbers of baseline resources for read buses, write buses, ALUs, load/store ports, multiply unit, divide unit, and BEU are 3, 2, 1, 1, 1, 1, and 1, respectively. The numbers of shared resources for read buses and write buses are 2 and 2, respectively. If an add instruction with 2 source registers and 1 destination register is issued with read time of 24, execution time of 25, and write time of 25, then the number of the baseline read buses 51A at time 24, shared write buses 52C at time 25, and baseline ALUs 53A at time 25 are incremented to 3, 2, and 2, respectively. Since the number of baseline write buses 52A is at maximum, the add instruction uses the shared write bus 52C to write data back to the baseline register set 50A. The source registers of the add instruction will receive data from the baseline read buses numbers 1 and 2, baseline ALU number 1 is used for execution of the add instruction and shared write bus number 1 is used to write back data from baseline ALU 1. The counts in the row are reset by the time count. As illustrated in FIG. 4, when the time count is incremented from 14 to 15, all resource counts of row 14 are reset. All resource counts of row 15 are reset when the count is incremented to 16 in next cycle. In the embodiment of FIG. 4 resources are assigned to the issued instruction in-order of the resource count. If an issued instruction is a multiply instruction with execution time of 25, since there is only one multiply unit 57A, the issued instruction cannot be issued for execution time of 25. In another embodiment, two read times, two execution times, and two write times are used per instruction with the expectation that one set of times is free of conflict, increasing the chance for instruction issuing. In another embodiment, the counts indicate the number of available resources. The resource counts are decremented if the resource is assigned to an issue instruction.

In one embodiment, each resource represented in the time-resource matrix 50 is implemented as an independent register file where the number of entries is the same as the time counter 90, and each entry consists of a resource count. The issue or replay instruction accesses individual resources as needed, instead of accessing all resources in the time-resource matrix.

The availability of all resources for the required times are read by the instruction issue unit 55 from the time-resource matrix 50 and sent to the instruction issue unit 55 for a decision of when to issue an instruction to the execution queue 70. If the resources are available at the required times, then the instruction can be scheduled and sent to the execution queue 70. The issued instruction updates the register scoreboard 40 with the write time and updates the time-resource matrix 50 to reduce the available resource values. All resources must be available at the required time counts for the instruction to be dispatched to the execution queue 70. If all resources are not available, then the required time counts for the instruction in question are incremented by one, and the time-resource matrix 50 is checked as soon as the same cycle or next cycle. The particular number of read buses 66, write buses 68, and functional units 75 in FIG. 1 is preferably chosen to minimize stalling of instructions in the instruction issue unit 55.

Figure 5A:
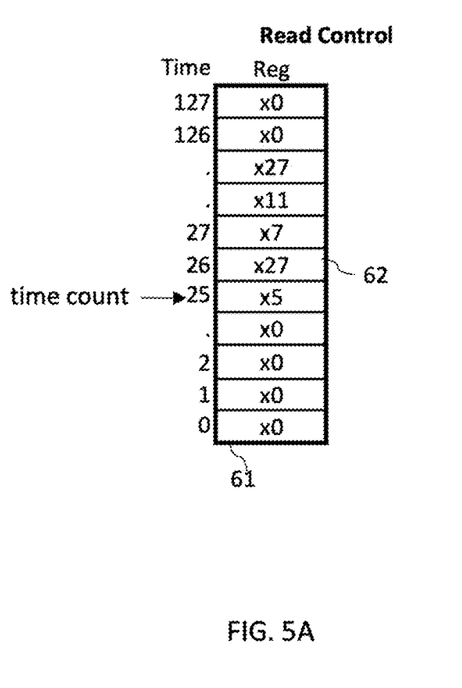
FIGS. 5A and 5B are block diagrams illustrating a read bus control and a write bus control.
Figure 5B:
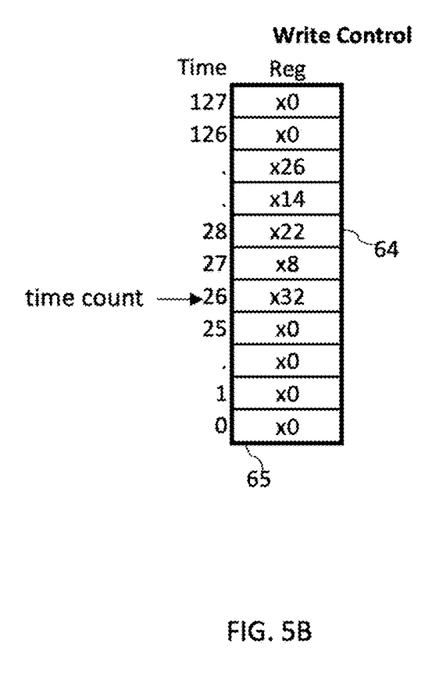

FIG. 5A illustrates a single read bus of the read control unit 62 and FIG. 5B a single write bus of the write control unit 64. The read control unit 62 and the write control unit 64 include a number of time entries to match the time counter 90. As mentioned above, in a preferred embodiment the time count is incremented every clock cycle. The columns in the read control unit 62 represent the source register 61. The column in the write control unit 64 represents the destination registers in the write bus 65. In one embodiment, microprocessor 10 uses the RISC-V instruction set architecture. In that architecture register 0 (x0) is not a real register; reading of register x0 returns 0 and writing to register x0 is ignored. The x0 register is used as an invalid read and write to the register file 60. If a different instruction set architecture is used, then the read control unit 62 and the write control unit 64 can include another column of valid bits (not shown) to indicate a valid read or write, respectively. As illustrated in FIGS. 5A and 5B, when the time count is incremented from 25 to 26, the register fields 61 and 65 of row 25 will be reset to x0. The register fields 61 and 65 of row 26 are reset to x0 when the count is incremented to 27 in next cycle. FIGS. 5A and 5B show a single read bus 66 and a single write bus 68, respectively. If, however, 4 read buses and 3 write buses are implemented, then FIGS. 5A and 5B are duplicated 4 times and 3 times, respectively.

In the example illustrated in FIG. 5A, at the time count of 25 the register x5 from the register field 61 of the read control 62 is used to read the entry 5 from the register scoreboard 40 for the valid bit 42, the "Funit" 44, and the write time 46. If the valid bit 42 is set and the write time 46 is equal to the time count 90, then the data is forwarded from the "Funit" 44 instead of reading from the register file 60. If the valid bit 42 is reset, then the data is read from the register file 60. If the valid bit 42 is set, and the write time 46 is greater than the time count 90, then the instruction is replayed where the write time 46 is the read time for the replay instruction. The replay instruction will access the time-resource matrix 50 to reissue the instruction to the replay execution queue. In the next cycle, when the time count is 26, the register x27 from the register field 61 is used to read from the register file 60. The read control unit 62 is responsible for supplying the source operand data on a specific one of the read buses 66. The execution queue 70 keeps the information of which one of the read buses 66 is to receive source operand data. The execution queues 70 and read control unit 62 are synchronized based on the time-resource matrix 50. The read control unit 62 provides centralized control for the read buses 66, thus reducing complexity from the hundreds of instructions in dynamic scheduling. Similarly, in FIG. 5B, the register x32 from the register field 65 of the write control unit 64 at time count of 26 is used to write to the register file 60. The register x32 will also access the "Funit" 44 of the register scoreboard 40 to get the result data from a specific functional unit 75. Again, the execution queues 70, the functional units 75, and the write control unit 64 are synchronized to transfer result data on a write bus 68 to write to the register file 60. The write control unit 64 is the centralized control for the write buses 68 which removes complexity compared to the plurality of functional units in dynamic scheduling.

Figure 6:
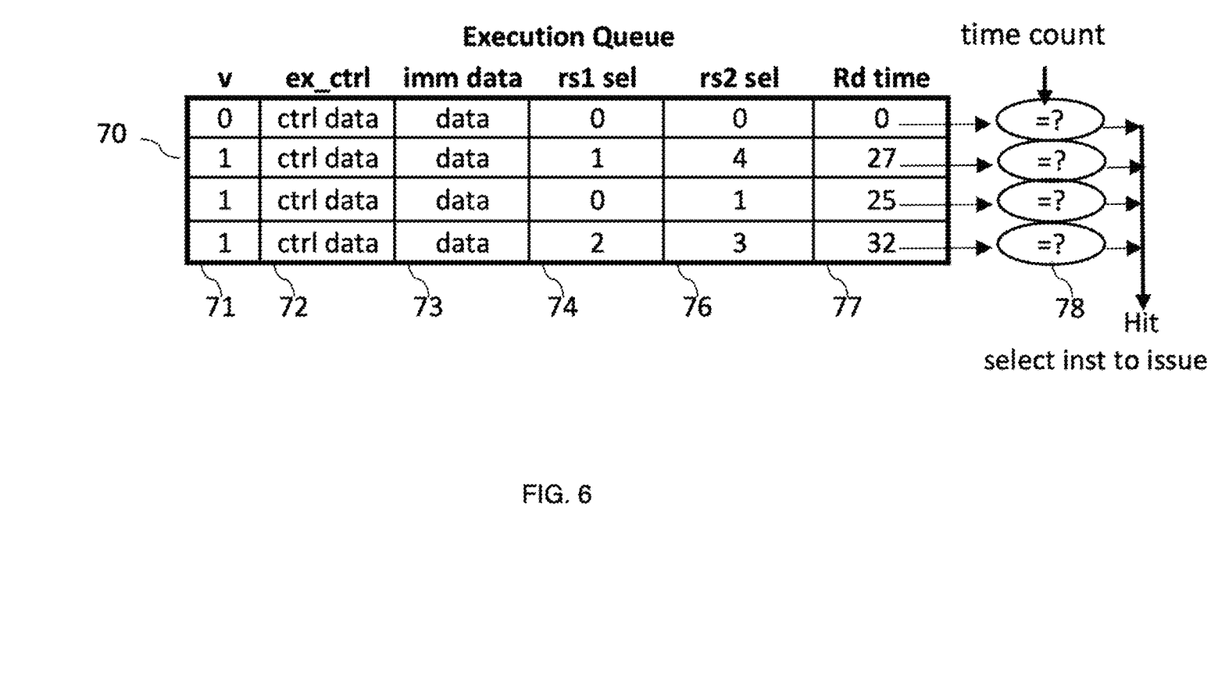
FIG. 6 is a block diagram illustrating an execution queue.

FIG. 6 illustrates an example of a 4-entry execution queue 70. The number of entries for the execution queue 70 is only an illustration. The invention is not limited to any number of execution queue 70 entries and the execution queue 70 could take the form of a single-entry execution queue. Each entry is an instruction waiting for execution by one of the functional units 75 or the load/store unit 80 according to the time count in the read time column 77. Each entry in the execution queue 70 preferably consists of the following fields: the valid bit 71, control data 72, the immediate data 73, the first source register select 74, the second source register select 76, and the read time 77. The valid bit 71 indicates that the entry is valid in the execution queue 70. The control data 72 specifies the specific operation to be used by the functional units 75 or the load/store unit 80. The immediate data 73 is an alternative to the second source register for the instruction. The valid indication for the immediate data 73 may be included in the control data field 72. Most instructions have an option to use immediate data 73 instead of data from the second source register. The first source register select 74 identifies which one of the read buses 66 has the operand data for the first source register. The second source register select 76 identifies which one of the read buses 66 has the operand data for the second source register. The source register selects 74, and 76 may not be used for some instructions.

Note that the destination register can be but does not need to be kept with the instruction. The write control unit 64 is responsible for directing the result data from a functional unit 75 to a write bus 68 to write to the register file 60. The execution queues 70 are only responsible for sending instructions to the functional units 75 or the load-store unit 80. The read time field 77 which has the read time of the instruction is synchronized with the read control unit 62. When the read time 77 is the same as the time count 90 as detected by the comparators 78, the instruction is issued to the functional units 75 or the load/store unit 80. For the example in FIG. 6, the entries are issued to the functional units out-of-order. The read time field 77 indicates that the second entry is issued at time count 25, the third entry is issued at time count 27, and the first entry is issued at time count 32.

In an embodiment, each functional unit 75 has its own execution queue 70. In another embodiment, an execution queue 70 dispatches instructions to multiple functional units 75. In this case, another field (not shown) can be added to the execution queue 70 to indicate the functional unit number for dispatching of instructions. This case further includes sharing of functional units between the baseline and extended instructions. In another embodiment, the baseline and extended functional units have independent baseline and extended execution queues.

Referring back to FIG. 1, the execution queues 70 are coupled to the load store unit (LSU) 80 and the functional units 75. The execution queues 70 issue the instructions to the functional units 75 or the load/store unit 80 when the read times 77 are the same as the time count 90. If the instruction is a load/store, then it is dispatched to the LSU 80, else it is dispatched to one of the functional units 75. The LSU 80 and functional units 75 are also coupled to the read buses 66 and write buses 68 to access the register file 60. The source operand data are fetched from register file 60 and transported on read buses 66 to the LSU 80 and functional units 75. The result data from the LSU 80 and functional units 75 are transported on write buses 68 to write to destination registers in the register file 60. The LSU 80 is also coupled to the data cache 85. The LSU 80 executes the load and store instructions to read and write data from the data cache 85. If the data are not in the data cache 85, then the cache miss causes that cache line to be fetched from external memory (not shown). Typically, the functional units 75 perform different operations, e.g., ALU, multiply, divide, branch, etc. In other embodiments, the functional units 75 perform the same function, for example, multiple ALUs. The invention is not limited to integer functional units. In other embodiments the functional units include floating point units, digital-signal processing units, vector processing units, or extended designed units.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A processor comprising:
a time counter storing a time count representing a current time of the processor, wherein the time count is incremented periodically;
a register file comprising a plurality of registers organized into at least two register sets, each of the register sets comprising a subset of the plurality of registers and wherein each of the register sets are of different sizes;
an instruction issue unit coupled to the time counter for receiving a first instruction and a second instruction, and issuing the first instruction with a first preset execution time based on the time count if the registers referenced by the first instruction are in a first register set, and issuing the second instruction with a second preset execution time based on the time count if the registers referenced by the second instruction are in a second register set;
a first execution queue coupled to the time counter and the instruction issue unit to receive the first instruction from the instruction issue unit, and dispatch the first instruction to a first functional unit when the first preset execution time corresponds to the time count;
a second execution queue coupled to the time counter and the instruction issue unit to receive the second instruction from the instruction issue unit, and dispatch the second instruction to a second functional unit when the second preset execution time corresponds to the time count;
a plurality of sets of read and write buses each set of read and write buses separately coupled to a corresponding set of functional units and a corresponding one of the at least two register sets;
wherein the read and write buses independently transport data between the corresponding one of the at least two register sets and the corresponding set of functional units;
a plurality of shared read and write buses coupled to the register sets of the register file;
and one or more shared functional units wherein the shared read and write buses transport data between the register sets of the register file and the one or more shared functional units.

2. The processor of claim 1 further comprising a register renaming unit wherein a lack of free registers for renaming of a destination register of one of the register sets causes instructions to be stalled in an instruction fetch stage.

3. The processor of claim 1 further comprising:
a clock circuit, wherein the time counter increments the time count with each clock cycle of the clock circuit;
wherein the time counter comprises an N-bit counter wherein an Nth-bit count value represents a largest future time for the instruction issue unit to issue an instruction wherein the N-bit counter returns to a zero count after reaching the Nth-bit count value;
a register scoreboard storing a write time of a register in the register file, and the write time is a future time of the time count;
an instruction decode unit coupled to the register scoreboard, wherein the instruction decode unit reads at least one write time for source operands of the instruction from the register scoreboard, and uses the at least one write time to determine an execution time for the instruction; and
time-resource matrix circuitry comprising a plurality of time-resource registers for storing information relating to available resources for each time count of the N-bit counter, and wherein the time-resource registers store information for resources that include at least one of: a plurality of read buses, a plurality of write buses, and a plurality of each type of functional units.

4. The processor of claim 3 wherein the time-resource registers identify a first plurality of resources of the first register set of the register file and a second plurality of resources of the second register set of the register file.

5. The processor of claim 4, wherein the time-resource registers identify a plurality of shared resources for the register sets of the register file.

6. The processor of claim 1 further comprising:
read control circuitry having registers storing time count entries specifying when operands may be read and transported on a read bus, and wherein the read control circuitry further accesses a register scoreboard to determine availability of a first register in the register file, wherein if a write time of the first register is the same as the time count data is forwarded instead of being read from the register file; and write control circuitry having write bus control registers storing time count entries specifying when result data may be transported on a write bus and written to a second register of the register file, and wherein the write control circuitry further accesses the register scoreboard to clear a valid bit if the write time stored in the write bus control registers is the same as the time count.

7. The processor of claim 6 wherein at least the first execution queue stores a plurality of instructions, and each of the plurality of instructions includes a read time which is represented by a future time count wherein at least the first execution queue dispatches instructions to at least one functional unit and wherein the read control circuitry is synchronized with a read time in the first execution queue.

8. The processor of claim 1 wherein one of the sets of functional units comprises extended functional units configured to process extended instructions.

9. A processor comprising:
a clock circuit;
a time counter storing a time count representing a specific time of operation of the processor, wherein the time count is incremented by the clock circuit;
a register file comprising a plurality of registers wherein the register file is organized as a plurality of register sets comprising a first register set and a second register set, wherein each of the register sets comprises a subset of the plurality of registers of the register file;
a plurality of functional units coupled with a one of the register sets;
a time-resource matrix coupled to a register scoreboard and the time counter for storing information relating to available resources for each time count of the time counter;
an instruction issue unit coupled to the time counter for receiving a first instruction and a second instruction, and issuing the first instruction with a first preset execution time based on the time count if registers referenced by the first instruction are in the first register set, and issuing the second instruction with a second preset execution time based on the time count if the registers referenced by the second instruction are in the second register set;
a first execution queue coupled to the time counter and the instruction issue unit to receive the first instruction from the instruction issue unit, and dispatch the first instruction to a first functional unit when the first preset execution time corresponds to the time count;
a second execution queue coupled to the time counter and the instruction issue unit to receive the second instruction from the instruction issue unit, and dispatch the second instruction to a second functional unit when the second preset execution time corresponds to the time count;
a register scoreboard storing a write time of a register in the register file, wherein the write time is a future time specified by the time count;
an instruction decode unit coupled to the register scoreboard, the instruction decode unit reading write times for source operands of each of the first and second instructions from the register scoreboard, and using the write times to determine an execution time for each of the first and second instructions; and
wherein the available resources include at least one of, a plurality of read buses, a plurality of write buses, and the plurality of functional units.

10. A method implemented in a processor comprising:
issuing a first instruction to a first execution queue with a first future time;
issuing a second instruction to a second execution queue with a second future time wherein each future time represents a time count from a periodically incremented time counter wherein the first instruction utilizes a first register set of a register file and the second instruction utilizes a second register set of the register file;
renaming a register referenced by the first instruction to the first register set of the register file and renaming a register referenced by the second instruction to the second register set of the register file;
stalling instructions for a register set during instruction fetch in response to no free register assigned to that register set being available for renaming; and
storing a write time of a register of the register file wherein the write time is a future time defined by the time count.

11. The method of claim 10 wherein a plurality of sets of read and write buses are separately coupled to a corresponding plurality of sets of functional units and register sets, and wherein the read and write buses independently transport data between a register set and corresponding functional units.

12. The method of claim 11 wherein a plurality of shared read and write buses are coupled to a plurality of register sets of the register file and a respective plurality of sets of functional units wherein the shared read and write buses transport data between the plurality of register sets of the register file and the respective plurality of sets of functional units.

13. The method of claim 12 further comprising storing information corresponding to available resources for each time count in a time-resource matrix, wherein the resources comprise at least one of a plurality of read buses, a plurality of write buses, and a plurality of functional units wherein the resources include a plurality of dedicated resources for a register set of the register file.

14. The method of claim 13, wherein the resources include a plurality of shared resources for a plurality of register sets of the register file.

15. The method of claim 14 further comprising:
storing in a register of a read control circuit a read time that specifies a first time that data may be read from the register file and transported on a read bus;
storing in a register of a write control circuit a write time that specifies a second time that result data may be transported on a write bus and written to a register of the register file;
storing a plurality of instructions in an execution queue, wherein each instruction includes a read time defined by the time count; and
synchronizing the read time of the execution queue with the read control circuit.

16. The method of claim 15 wherein the time counter provides a maximum time count corresponding to a latest future time to issue an instruction.

17. A computer program product for issuing an instruction, the computer program product stored on a non-transitory computer readable storage medium and including instructions for causing a computer system to execute a method that is executable by a processor, the method comprising:

issuing a first instruction to a first execution queue with a first future time;

issuing a second instruction to a second execution queue with a second future time wherein each future time represents a time count from a periodically incremented time counter wherein the first instruction utilizes a first register set of a register file and the second instruction utilizes a second register set of the register file;

renaming a register referenced by the first instruction to the first register set of the register file and renaming a register referenced by the second instruction to the second register set of the register file;

stalling instructions for a register set during instruction fetch in response to no free register assigned to that register set being available for renaming; and storing a write time of a register of the register file wherein the write time is a future time defined by the time count.

18. The computer program product of claim 17 wherein a plurality of sets of read and write buses are separately coupled to a corresponding plurality of sets of functional units and register sets, and wherein the read and write buses independently transport data between a register set and corresponding functional units.

19. The computer program product of claim 18 wherein a plurality of shared read and write buses are coupled to a plurality of register sets of the register file and a respective plurality of sets of functional units wherein the shared read and write buses transport data between the plurality of register sets of the register file and the respective plurality of sets of functional units.

20. The computer program product of claim 19 wherein the method further comprises:

storing information corresponding to available resources for each time count in a time-resource matrix, wherein the resources comprise at least one of a plurality of read buses, a plurality of write buses, and a plurality of functional units wherein the resources include a plurality of dedicated resources for a register set of the register file.

21. The computer program product of claim 20, wherein the resources include a plurality of shared resources for a plurality of register sets of the register file.

22. The computer program product of claim 21 wherein the method further comprises:

storing in a register of a read control circuit a read time that specifies a first time that data may be read from the register file and transported on a read bus;

storing in a register of a write control circuit a write time that specifies a second time that result data may be transported on a write bus and written to a register of the register file;

storing a plurality of instructions in an execution queue, wherein each instruction includes a read time defined by the time count; and synchronizing the read time of the execution queue with the read control circuit.

23. The computer program product of claim 22 wherein the time counter provides a maximum time count corresponding to a latest future time to issue an instruction.

* * * * *